United States Patent
Roshandel

(10) Patent No.: US 7,647,245 B1
(45) Date of Patent: Jan. 12, 2010

(54) SECURITY SYSTEM-RELATED MARKETING SYSTEM AND METHOD

(75) Inventor: Mike Roshandel, Hasbrouck Heights, NJ (US)

(73) Assignee: Panasonic Corporation of North America, Secaucus, NJ (US)

( * ) Notice: Subject to any disclaimer, the term of this patent is extended or adjusted under 35 U.S.C. 154(b) by 1327 days.

(21) Appl. No.: 10/365,365

(22) Filed: Feb. 12, 2003

(51) Int. Cl.
*G06Q 30/00* (2006.01)
(52) U.S. Cl. .................. 705/26; 340/5.1; 340/7.21; 340/506; 379/37
(58) Field of Classification Search .............. 705/26; 340/531
See application file for complete search history.

(56) References Cited

U.S. PATENT DOCUMENTS

| | | | | |
|---|---|---|---|---|
| 3,786,502 | A * | 1/1974 | Stendig ................ | 340/531 |
| 5,457,730 | A | 10/1995 | Rounds | |
| 5,745,849 | A | 4/1998 | Britton | |
| 5,799,062 | A | 8/1998 | Lazzara et al. | |
| 6,064,303 | A * | 5/2000 | Klein et al. ............ | 340/506 |
| 6,215,404 | B1 * | 4/2001 | Morales ................ | 340/531 |
| 6,308,083 | B2 * | 10/2001 | King .................... | 455/556.1 |
| 6,693,530 | B1 * | 2/2004 | Dowens et al. ........ | 340/506 |
| 7,167,543 | B2 * | 1/2007 | Bennett et al. ........ | 379/37 |
| 7,561,019 | B2 * | 7/2009 | Sasakura et al. ...... | 340/5.1 |
| 2003/0023411 | A1 * | 1/2003 | Witmer et al. ........ | 703/1 |
| 2004/0217847 | A1 * | 11/2004 | Fries et al. ............ | 340/7.21 |

OTHER PUBLICATIONS

Nichole Harris, "Sneak Peek: These systems can help keep an eye on your home while you're away", Dec. 16, 2002, Wall Street Journal, p. R9.*
ORCA, "The best in home security monitoring services", Mar. 30, 2002, web.archive.org.*
Tyco International, "ADT Redefines Home Security and Home Control with the Introduction of the Safewatch iCenter", May 22, 2001, prnewswire.com.*
RadioShack, "RadioShack Launches Nationwide Home Security Marketing Program; Monitored Security Products and Services To Be Offered", Jul. 30, 1996, Business Wire.*
Radioshack Launches Nationwide Home Security Marketing Program; Monitored Security Products To Be Offered, Business Wire, Jul. 30, 1996.*

* cited by examiner

*Primary Examiner*—Matthew S Gart
*Assistant Examiner*—R. Shay Glass
(74) *Attorney, Agent, or Firm*—Harness, Dickey & Pierce, PLC

(57) ABSTRACT

A security system-related marketing system includes a retail environment receptive of walk-in traffic and adapted to market goods and services to consumers. A security system-compliant device adapted to operate as a component of a security system is physically disposed in the retail environment, thereby permitting a purchaser to take physical possession of the device during a purchasing process. A security system component package is also marketed in the retail environment to purchasers of the device, thereby permitting a purchaser of the device to obtain rights to a predetermined set of security system components in the retail environment that substantially provide the security system. Security system services are further marketed in the retail environment to purchasers of the security system component package, thereby permitting a purchaser of the package to obtain rights to security system services in the retail environment.

14 Claims, 3 Drawing Sheets

SECURITY SYSTEM-RELATED MARKETING SYSTEM AND METHOD

FIELD OF THE INVENTION

The present invention generally relates to security system marketing systems and methods, and particularly relates to sale of security system component packages and services in a retail environment with a security system-compliant device.

BACKGROUND OF THE INVENTION

Generally, security systems have been sold through authorized dealers requiring a large amount of sales resources including sales people arranging to visit and visiting a location where a security system is to be installed. According to this marketing method, the sales force expends a substantial amount of time setting up appointments with customers and traveling to a customer location. The sales force also has to possess knowledge and skill necessary to determine the relevant attributes of the customer location, and spend time determining an appropriate security system to offer the customer. Accordingly, the number of customers that a sales person can service in a given amount of time is severely limited. Further, since the selling of security systems requires on-site evaluation and specialized skills, sale of security systems through a retailer in the consumer electronics market is not feasible.

Further to this method of marketing security systems, the systems are sold and marketed directly through a security service provider (SSP) or authorized representative. The dealer, which may be the SSP, an installer, or third party facilitator, attempts to sell the customer a security services contract that includes monitoring services, fees for which are often used to subsidize the security system, installation, and/or sales representation. After the sale, the installer, which may be an internal installer of the SSP or an independent service provider, may attempt to sell the customer additional security system components.

Previous attempts to market security systems in a retail environment have failed because they have required the customer to act in the capacity of the dealer in many respects. Accordingly, the customer has been forced to identify and purchase the appropriate security system components and either install them or locate and engage a professional installer to do so. Further accordingly, the customer has been required to locate a SSP to provide monitoring services and contract with them directly. Therefore, there remains a need for a system and method of marketing security systems in a retail environment that overcomes the obstacles to such marketing that have thwarted previous attempts. The present invention provides a system and method that provides a solution.

SUMMARY OF THE INVENTION

A security system-related marketing system includes a retail environment receptive of walk-in traffic and adapted to market goods and services to consumers. A security system-compliant device adapted to operate as a component of a security system is physically disposed in the retail environment, thereby permitting a purchaser to take physical possession of the device during a purchasing process. A security system component package is also marketed in the retail environment to purchasers of the device, thereby permitting a purchaser of the device to obtain rights to a predetermined set of security system components in the retail environment that substantially provide the security system. Security system services are further marketed in the retail environment to purchasers of the security system component package, thereby permitting a purchaser of the package to obtain rights to security system services in the retail environment. Security system services can be installation services and/or monitoring services.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
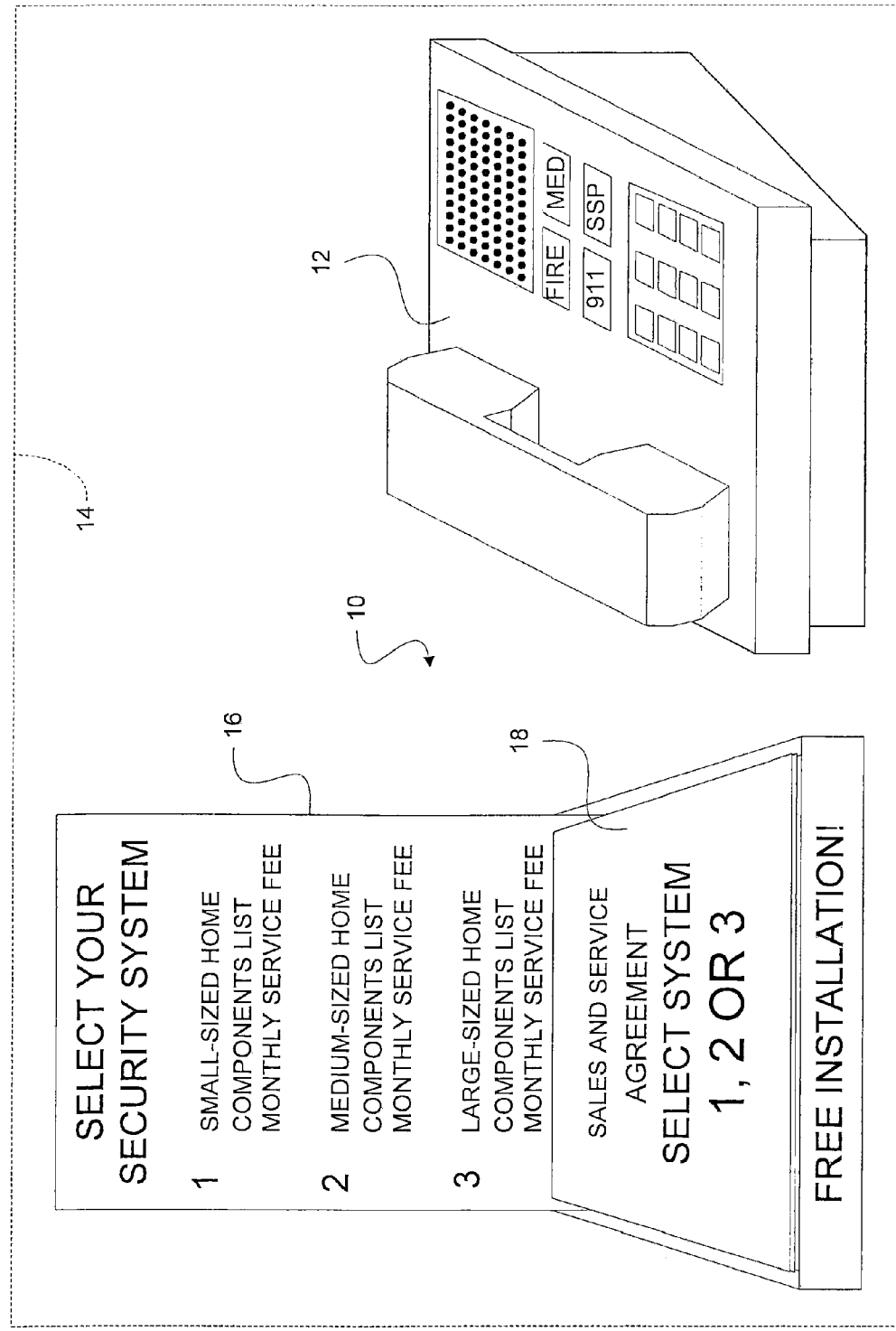
FIG. 1 is a perspective view of security system-related benefits marketed in a retail environment.

As shown in FIG. 1, multiple security system packages 10 and security system-compliant device 12 are marketed in retail environment 14. In a preferred embodiment, packages 10 include visual display 16 of predetermined sets of security system components selected for various house-sizes, and security system sale and service contractual offers 18 enabling a purchaser to select a package suitable to the purchaser's particular needs. Preferably, display 16 includes visual illustrations of package components for the different sets, including a photo or illustration of device 12, which is adapted to operate as a component of the security system and may have other functions. For example, in one sub-embodiment device 12 corresponds to a telephone adapted to function as a security panel of the security system. In this embodiment, device 12 may provide communication between a SSP providing monitoring service and peripheral devices, such as sirens and sensors, including glass-break detectors, fire detectors, and door sensors. Cordless handsets may additionally or alternatively be purchased as device 12, and device 12 can therefore serve as a peripheral, auditory sensor accessible to and operable by an SSP through a local communications network corresponding to the security system.

Device 12 is preferably physically disposed in the retail environment so that a purchaser can take possession of it immediately upon sale and begin to use it immediately in its capacity, for example, as a communication device. Preferably, device 12 has functionality making it attractive to consumers based on its functionality independent of interfacing with a security system, as with a telephone or smoke detector, and is available for sale independently of purchase of packages 10. Device 12, however, can simply function only as a component of a security system in alternative embodiments. Similarly, the installation and monitoring service benefits of packages 10 are preferably offered only to purchasers of device 12, but device 12 may only be available to purchasers of packages 10 in alternative embodiments. Although not shown, information may be prominently displayed in the retail environment to direct a potential purchaser's attention from device 12 to packages 10, and from packages 10 to device 12. Also, information may also communicate availability of additional security system components to purchaser's of packages 10, along with availability of professional evaluation and installation services wherein additional hardware may be purchased from the installer.

Figure 2:
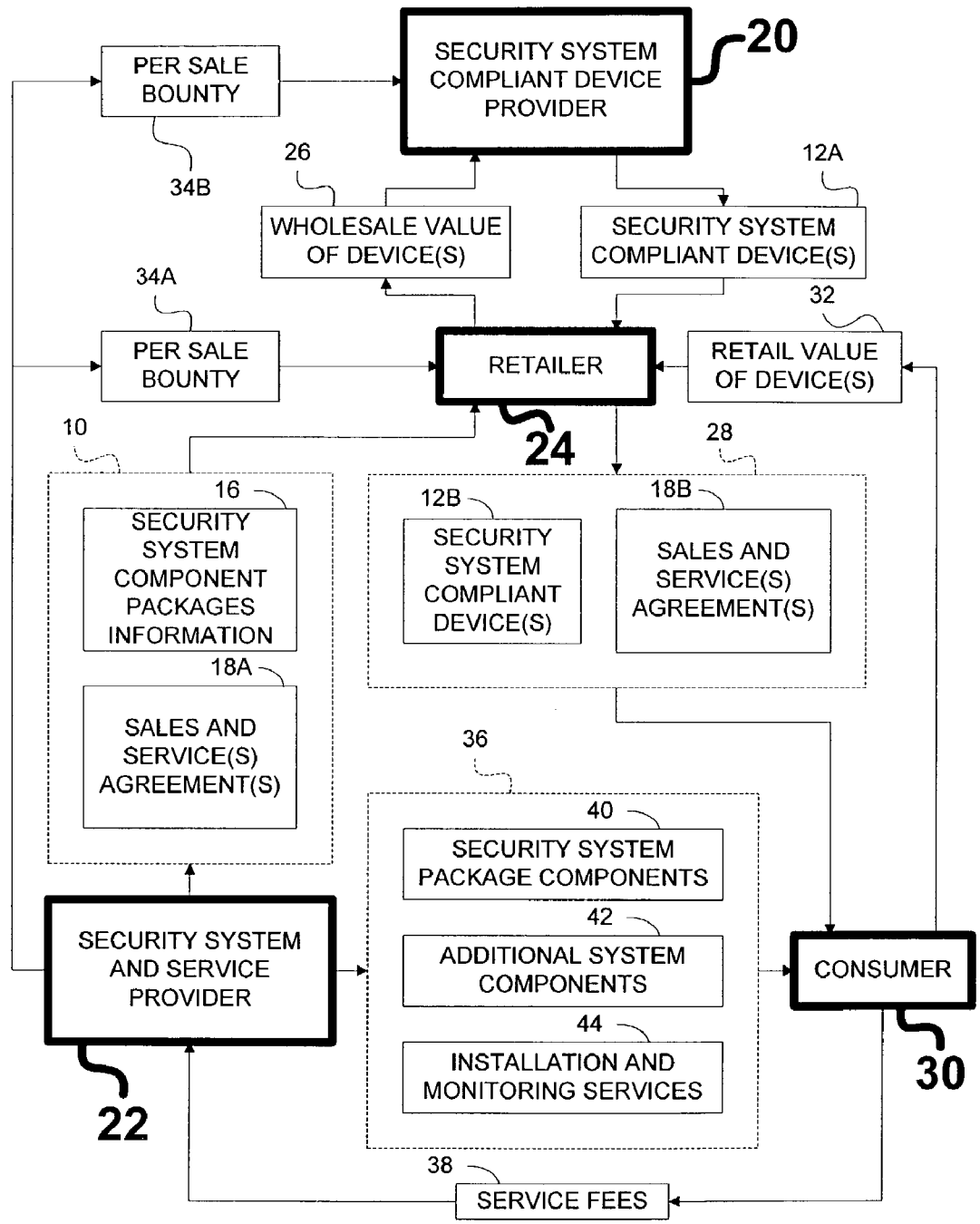
FIG. 2 is a block diagram of a security system-related marketing system in accordance with the present invention.

FIG. 2 illustrates a marketing system of the present invention. Therein, a provider 20 of a security system-compliant device establishes a relationship; for example, a contractual relationship, with one or more parties. In one embodiment, a provider 20 of a security system compliant device contracts with a provider 22 of security systems and services. According to the contractual incentives thus enacted, provider 20 sells security system compliant devices 12A to retailer 24 in exchange for wholesale value 26 of the devices. Also, security system and service provider 22 provides security system component packages 10 in the form of displays 16 relating package information and agreements 18A for sale of system components, installation services, and monitoring services at fees, for example, variable according to the component package selected by the consumer and additional component purchases. In turn, retailer 24 conveys the benefit of sales support in a retail environment and sells one or more security system-related benefits 28 to consumers 30 including, for example, security system compliant devices 12B and rights to security system components and services by virtue of sales and service agreements 18B. In another embodiment, a provider 20 of a security system compliant device contracts with a retailer 24. In yet another embodiment, a provider 20 of a security system compliant device contracts with a provider 22 of security systems and services and retailer 24.

Contractual incentives for the parties are fulfilled as the system procedures unfold. For example, retailer 24 provides sales support in exchange for retail value 32 of the devices and resulting profit, and in exchange for a per sale bounty from the security system and service provider 22 as at 34A, which is preferably shared with security system compliant device provider 20 as at 34B. Thus, device provider 20 provides devices 12A in exchange for profit obtained in the form of wholesale value 26 and/or a per sale bounty, for example, as provided by a security system and service provider 22 as at 34B. In another embodiment, a per sale bounty may be provided by retailer 24 in lieu of or in addition to security system and service provider 22. Likewise, security system and service provider 22 supplies a consumer 30 with security system-related goods and services 36 in exchange for monitoring service fees 38, and goods and services 36 include pre-determined security system components 40, additional components 42 if desired by consumer 30, and installation services and monitoring services 44. System and service provider 22 preferably subsidizes security system components 42 and 44 and installation thereof in exchange for the benefit of monitoring service fees 38, which may be raised to cover costs of additional security system components desired by a consumer. It should be readily understood that security system and service provider 22 may comprise several business entities, including a security system component manufacturer, a monitoring service provider, and/or an installer.

Figure 3:
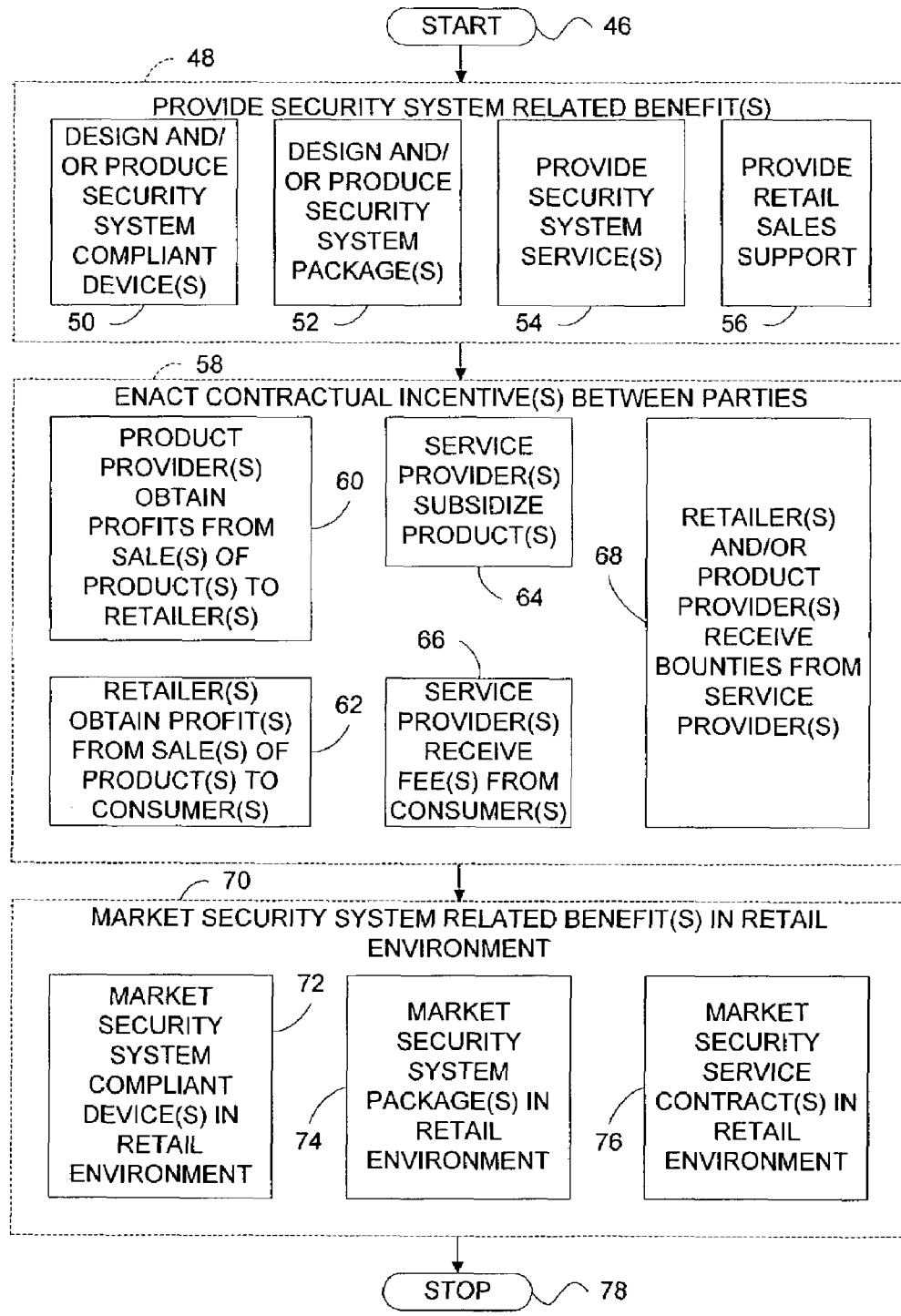
FIG. 3 is a flow diagram depicting a security system-relating marketing method in accordance with the present invention.

FIG. 3 illustrates the marketing method according to the present invention. Beginning at 46, the method includes providing a security system-related benefit at step 48. Accordingly, step 48 includes, for example, designing and/or producing a security system-compliant device at step 50, designing and/or producing a security system package at step 52, and providing a security system-related service, such as providing installation and/or monitoring services at step 54, and providing sales support at step 56. The method further includes enacting contractual incentives between parties providing the benefits at step 58. Accordingly, step 58 further includes, for example, agreeing that product providers obtain profits from sale of products to retailers at step 60, agreeing that retailers obtain profits from sales of products to consumers at step 62, agreeing that service providers subsidize products and/or services at step 64, agreeing that service providers receive fees from consumers at step 66, and/or agreeing that retailers and/or product providers receive bounties from service providers at step 68. The method further includes marketing security system-related benefits in a retail environment at step 70. Accordingly, step 70 still further includes, for example, marketing security system-compliant devices in a retail environment at step 72, marketing security system packages in a retail environment at step 74, and marketing security system installation and/or monitoring service contracts in a retail environment at step 76. The method ends at 78.

The description of the invention is merely exemplary in nature and, thus, variations that do not depart from the gist of the invention are intended to be within the scope of the invention. For example, the system and method of the present invention has been described with respect to a preferred embodiment that creates new relationships and/or changes existing relationships between business entities accustomed to providing security system component sales, installation, and monitoring services in concert with one another. Therefore, shifting market forces resulting, for example, from influence of the present invention, may result in a different set of relationships between manufacturers and suppliers of security system components and security system installation and monitoring services that can cause adjustment to functions performed by one or more parties described herein. Also, the security system-compliant device may be subsidized by service fees, and therefore provided to the consumer for less than fair market value. Further, multiple security system-compliant devices from multiple providers can be marketed in the retail environment, and the multiple providers can each receive a bounty for sale of their products. Yet further, a the security monitoring service may be made optional, so that the security system component package may be sold to a consumer for due consideration if the service is not purchased to make up for lack of subsidization. Further still, a retailer may market a security system compliant device, security system component package, and or security system services by informing consumers of availability of the device, package, and/or service, but without granting rights in one or more of the device, package, or service in the retail environment; the retailer may still receive a bounty for a sales lead. Such variations are not to be regarded as a departure from the spirit and scope of the invention.

What is claimed is:

1. A security system-related marketing system, comprising:
   a retail environment receptive of walk-in traffic and adapted to market goods and services to consumers;
   a telephone, physically disposed in said retail environment, having a designated component deactivated and of a home security system operated by a remote security service provider, wherein said designated component, when activated, functions as a security panel of the home security system and relays communication between the remote security service provider and peripheral devices, of the home security system and installed at a home, including at least one of a siren, a glass-break detector, a fire detector, and a door sensor, wherein said telephone has a telecommunication functionality independent of interfacing with the home security system;

at least one security system component package, physically disposed in said retail environment, granting rights to activate the designated component of the telephone and to receive security services including operating the home security system, provided by the remote security service provider, thereby permitting a purchaser to purchase, in said retail environment, one or more of said at least one security system component package and thereby obtain rights to at least one predetermined set of security system components that substantially provide the home security system; and security system monitoring services marketed in said retail environment to purchasers of said one or more of said at least one security system component package, thereby permitting the purchaser of said telephone and said one or more of said at least one security system component package to obtain rights to said security system monitoring services by purchasing said security system monitoring services in said retail environment, wherein said telephone is available for sale in said retail environment independently of purchase of said at least one security system component package.

2. The security system-related marketing system of 1, wherein said security system is installed in a home environment, wherein said telephone utilizes said designated component to serve as a sensor, of the security system, that is accessible and operable by the security service provider.

3. A security system-related marketing system, comprising:

a telephone having a designated component of a home security system that is operated by a remote security service provider, the designated component being selectively activated or deactivated;

wherein said designated component, when activated, functions as a security panel of the home security system and relays communication between the remote security service provider and peripheral devices that are of the home security system and that are installed at a home, wherein said designated component serves as a sensor, of the home security system, that is accessible and operable by the security service provider;

wherein said telephone has a telecommunication functionality independent of interfacing with the home security system.

4. The security system-related marketing system of 3, wherein the peripheral devices include at least one of a siren, a glass-break detector, a fire detector, and a door sensor.

5. The security system-related marketing system of 3, wherein only a cordless handset of the telephone includes the designated component, wherein the cordless handset serves as an auditory sensor.

6. The security system-related marketing system of 5, wherein the cordless handset is accessible to and operable by the remote security service provider through a local communication network.

7. A security system-related marketing method, comprising:

marketing a telephone in a retail environment receptive of walk-in traffic and adapted to market goods and services to consumers, wherein the telephone has a designated component deactivated and of a home security system operated by a remote security service provider, wherein said designated component, when activated, functions as a security panel of the home security system and relays communication between the remote security service provider and peripheral devices, of the home security system, installed at a home, wherein said telephone has a telecommunication functionality independent of interfacing with the home security system;

marketing at least one security system component package in the retail environment, granting rights to activate the designated component of the telephone and to receive security services, including operating the home security system, provided by the remote security service provider to a purchaser of the telephone and the security system component package.

8. The method of claim 7, wherein said marketing at least one security system component package includes marketing first and second security system component packages in the retail environment, the method further comprising:

conveying first benefits, to the purchaser of the first security system component package, that include a first predetermined set of security system services and devices that substantially constitute the security system, and conveying second benefits, to the purchaser of the second security system component package, that include a second predetermined set of security system services and devices that substantially constitute the security system.

9. The method of claim 8, further comprising:

selecting a first set of security system services and devices based on predetermined criteria to form the first security system component package; and selecting a second set of security system services and devices to form the second security system component package.

10. The method of claim 9, wherein the predetermined criteria include house size.

11. The method of claim 7, further comprising marketing a security system installation services package; and conveying a benefit including installation of a predetermined set of security system devices to the purchaser of the security system installation services package.

12. The method of claim 11, wherein said marketing a security system installation services package includes marketing optional services including installation of security system components in addition to the predetermined set of security system devices.

13. The method of claim 7, further comprising enacting contractual incentives including payment of a bounty by the remote security service provider.

14. The method of claim 13, further comprising paying the bounty to at least one of a retailer providing sales support in the retail environment and a supplier of the telephone.

* * * * *